United States Patent
Choi et al.

(10) Patent No.: US 8,166,230 B2
(45) Date of Patent: Apr. 24, 2012

(54) MEMORY SYSTEMS AND METHODS OF INITIALIZING THE SAME

(75) Inventors: Jin-Hyeok Choi, Yongin-si (KR); Sung-Hoon Lee, Seoul (KR); Si-Hoon Hong, Seongnam-si (KR); Tae-Keun Jeon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 486 days.

(21) Appl. No.: 12/353,403

(22) Filed: Jan. 14, 2009

(65) Prior Publication Data

US 2010/0011164 A1    Jan. 14, 2010

(51) Int. Cl.
*G06F 13/00* (2006.01)
*G06F 13/28* (2006.01)
*G06F 9/00* (2006.01)

(52) U.S. Cl. ..... 711/103; 711/115; 711/5; 711/E12.002; 713/1; 713/100

(58) Field of Classification Search .................. 711/103, 711/115, 5, E12.002; 713/1, 100
See application file for complete search history.

(56) References Cited

U.S. PATENT DOCUMENTS

| | | | |
|---|---|---|---|
| 6,973,519 B1 | 12/2005 | Estakhri et al. | |
| 2004/0153582 A1* | 8/2004 | Oyama et al. | 710/15 |
| 2005/0120163 A1* | 6/2005 | Chou et al. | 711/103 |
| 2006/0075395 A1* | 4/2006 | Lee et al. | 717/168 |
| 2008/0155207 A1* | 6/2008 | Eilert et al. | 711/154 |
| 2011/0113158 A1* | 5/2011 | Cedar et al. | 710/3 |

FOREIGN PATENT DOCUMENTS

| | | |
|---|---|---|
| JP | 11-272601 | 10/1999 |
| KR | 1020030033029 | 4/2003 |

* cited by examiner

*Primary Examiner* — Edward Dudek, Jr.
(74) *Attorney, Agent, or Firm* — Volentine & Whitt, PLLC

(57) ABSTRACT

A memory system is provided includes a host processor, and a plurality of cascade connected memory cards connected to the host processor. Each of the memory cards stores a same default relative card address (RCA) prior to initialization of the memory system. The host processor is configured to sequentially access each memory card using the default RCA, and to change the default RCA to a unique RCA upon each sequential access.

20 Claims, 21 Drawing Sheets

Fig. 6

Command token(64bits)

| Width(bit) | 1 | 1 | 1 | 3 | 6 | 32 | 6 | 7 | 1 |
|---|---|---|---|---|---|---|---|---|---|
| Description | Start bit | Transmission | Data/Command | RCA | CMD index | Argument | Reserved | CRC7 | End bit |

Fig. 7

Response token(32bits)

| Width(bit) | 1 | 1 | 1 | 3 | 6 | 1 | 1 | 7 | 7 | 1 |
|---|---|---|---|---|---|---|---|---|---|---|
| Description | Start bit | Transmission | Data/Response | RCA | CMD index | Busy bit | Error bit | Card Status Error | CRC7 | End bit |

Fig. 8

Data token

| Width(bit) | 1 | 1 | 1 | 3 | 22 | 512 Byte | 16 | 1 |
|---|---|---|---|---|---|---|---|---|
| Description | Start bit | Transmission | Data/Command | RCA | Packet Information | Sector DATA | CRC16 | End bit |

Fig. 9

|  | Default RCA | RCA |
|---|---|---|
| CARD1 | 111 | 000 |
| CARD2 | 111 | 001 |
| CARD3 | 111 | 010 |
| CARD4 | 111 | 011 | ex) 111_111

Fig. 13

Command token(64bits)

| Width(bit) | 1 | 1 | 1 | 6 | 6 | 32 | 9 | 7 | 1 |
|---|---|---|---|---|---|---|---|---|---|
| Description | Start bit | Transmission | Data/Command | RCA (CN+PN) | CMD index | Argument | Reserved | CRC7 | End bit |

Fig. 14

Response token(32bits)

| Width(bit) | 1 | 1 | 1 | 6 | 6 | 1 | 1 | 7 | 7 | 1 |
|---|---|---|---|---|---|---|---|---|---|---|
| Description | Start bit | Transmission | Data/Response | RCA (CN+PN) | CMD index | Busy bit | Error bit | Card Status Error | CRC7 | End bit |

Fig. 15

Data token

| Width(bit) | 1 | 1 | 1 | 6 | 22 | 512 Byte | 16 | 1 |
|---|---|---|---|---|---|---|---|---|
| Description | Start bit | Transmission | Data/Command | RCA (CN+PN) | Packet Information | Sector DATA | CRC16 | End bit |

Fig. 17

|  | Default RCA | RCA |
|---|---|---|
| CARD1 | 111_111 | 000_000<br>000_001<br>(2 patition) |
| CARD2 | 111_111 | 001_000 |
| CARD3 | 111_111 | 010_000 |
| CARD4 | 111_111 | 011_000 |

MEMORY SYSTEMS AND METHODS OF INITIALIZING THE SAME

PRIORITY CLAIM

A claim of priority is made to Korean patent application 2008-0010253, filed Jan. 31, 2008, the disclosure of which is incorporated herein in its entirety.

SUMMARY

The present invention generally relates to systems which include memories, and more particularly, the present invention relates to memory systems including a plurality of cascade-connected memories connected to a host processor, and to methods of initializing such memory systems.

Memory systems are generally know in which multiple memory cards are connected in a cascade arrangement (i.e., one after the other) to a host processor. Commands and data are sequentially passed card-to-card to and from the host processor during a normal operation of the memory system. However, prior to normal operations, it is necessary for the host processor initialize the system to determine the logical location and types of memory cards connected thereto.

According to an aspect of the present invention, a method of initializing a memory system is provided, where the memory system includes a host processor and a plurality of memory cards, and the memory cards connected in a cascade arrangement and each includes a relative card address (RCA) register. The method includes storing in advance a same default RCA in the RCA register of each memory card, and sequentially storing respectively unique RCAs in the memory cards by issuing a sequence of commands from the host processor using the default RCA.

According to another aspect of the present invention, a memory system is provided which includes a host processor, and a plurality of cascade connected memory cards connected to the host processor, each of the memory cards storing a same default relative card address (RCA). The host processor is configured to sequentially access each memory card using the default RCA, and to change the default RCA to a unique RCA upon each sequential access.

According to yet another aspect of the present invention, a computer system is provided which includes a host processor, a plurality of peripheral devices operatively coupled to the host processor, and a memory device operatively coupled to the host processor. The memory device include a plurality of cascade-connected memory cards, where each of the memory cards includes a relative card address (RCA) register storing a same default RCA prior to initialization of the computer system. Upon initialization of the computer system, the host processor is configured to sequential accesses the cascade-connected memory cards using the default RCA.

BRIEF DESCRIPTION OF THE DRAWINGS

The above and other aspects and features of the present invention will become readily apparent from the detailed description that follows, with reference to the accompanying drawings, in which:

FIG. 6 illustrates a command token of the memory system of FIG. 1 according to an embodiment of the present invention;

FIG. 7 illustrates a response token of the memory system of FIG. 1 according to an embodiment of the present invention;

FIG. 8 illustrates a data token of the memory system of FIG. 1 according to an embodiment of the present invention;

FIG. 9 illustrates card address of the memory system of FIG. 1 according to an embodiment of the present invention;

FIG. 13 illustrates a command token of the memory system of FIG. 10 according to an embodiment of the present invention;

FIG. 14 illustrates a response token of the memory system of FIG. 10 according to an embodiment of the present invention;

FIG. 15 illustrates a data token of the memory system of FIG. 10 according to an embodiment of the present invention;

FIG. 17 illustrates card address of the memory system of FIG. 10 according to an embodiment of the present invention;

DETAILED DESCRIPTION OF EMBODIMENTS

The present invention will be described in detail below by way of preferred, but non-limiting, embodiments of the invention. The embodiments presented herein are considered examples of various implementations of the invention, and are not intended to limit or specifically define the overall scope of the invention.

For ease of understanding and to avoid redundancy, like reference numbers refer to the same or similar elements throughout the drawings. Also, while the drawings contain a number of circuit elements, it will be understood from the nature of electrical circuits that when an element is described as being connected to another element, it can be directly connected the other element or one or more intervening elements may be present. In contrast, if an element is referred to as being "directly connected to" another element, then no intervening elements are present. Other words used to describe the relationship between elements should be interpreted in a like fashion (e.g., "between" versus "directly between," "adjacent" versus "directly adjacent," "connected" versus "directly connected," etc.).

As is traditional in the field of the present invention, embodiments of the invention may be described at least partially in terms of functional blocks or units. It will be readily understood that the functional blocks or units denote electronic circuits which are configured (e.g., by dedicated and/or programmable circuitry) to execute the signaling and/or computational operations described herein. Also, it will be readily understood that one or more functional blocks may be physically combined into complex circuitry without departing from the spirit and scope of the present invention.

Figure 1:
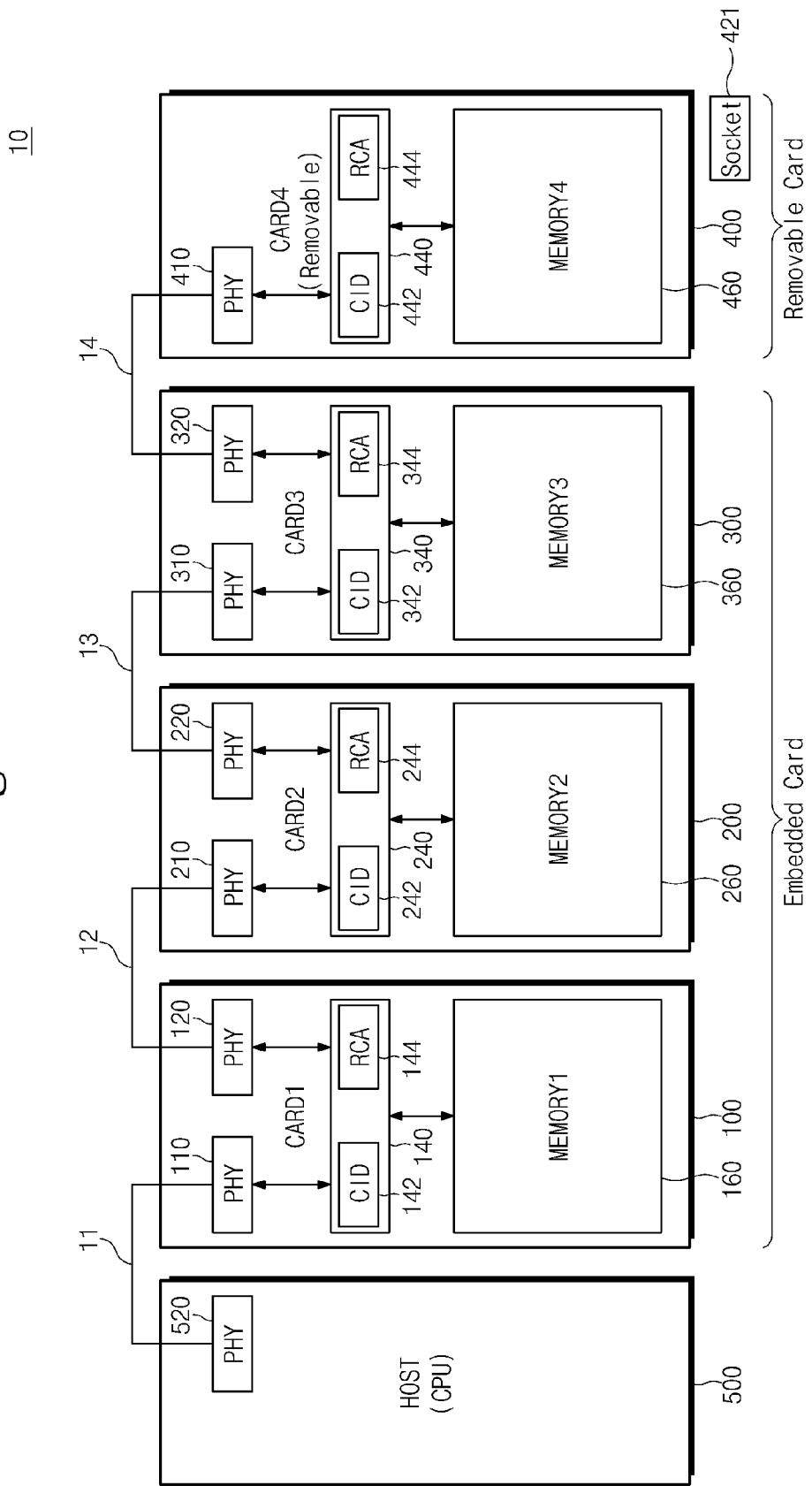
FIG. 1 illustrates a memory system according to an embodiment of the present invention.

FIG. 1 illustrates a memory system 10 according to an embodiment of the present invention. As shown, the memory system 10 of this example includes a host unit 500, one or more embedded memory cards 100, 200 and 300, and a removable memory card 400. The removable card 400 is removably attached to the memory system 10 by way of a card socket 421.

The memory cards 100, 200, 300 and 400 are cascade connected to the host 500. In particular, a bus 11 is connected between physical layers (PHY) 520 and 110 of the host 500 and memory card 100 (CARD1), respectively. A bus 12 is connected between physical layers (PHY) 120 and 210 of the memory card 100 (CARD1) and memory card 200 (CARD2), respectively. A bus 13 is connected between physical layers (PHY) 220 and 310 of the memory card 200 (CARD2) and memory card 300 (CARD3), respectively. A bus 14 is connected between physical layers (PHY) 320 and 410 of the memory card 300 (CARD3) and memory card 400 (CARD4), respectively.

Each of the embedded memory cards 100, 200 and 300 includes a memory 160, 260 and 360, respectively (MEMORY1, MEMORY2 and MEMORY3). The memories 160, 260 and 360 may be configured of volatile, non-volatile memory or a combination thereof. Non-limiting examples of volatile memory include RAM, SRAM, DRAM, EDORAM (Enhanced Data Output RAM), High-Speed DRAM, SDRAM, and DDR-SDRAM. Non-limiting examples of non-volatile memory include ROM, EEPROM, Flash Memory, MRAM, PRAM and FRAM.

The removable memory card 400 also includes a memory 460 (MEMORY4), which may be a non-volatile memory such as ROM, EEPROM, Flash Memory, MRAM, PRAM and/or FRAM.

The memory cards 100, 200, 300 and 400 are further equipped with controllers 140, 240, 340 and 440 respectively. In particularly, the controller 140 of the embedded memory card 100 (CARD1) is operatively positioned between the memory 160 and the physical layers 110 and 120. The controller 240 of the embedded memory card 200 (CARD2) is operatively positioned between the memory 260 and the physical layers 210 and 220. The controller 340 of the embedded memory card 300 (CARD3) is operatively positioned between the memory 360 and the physical layers 310 and 320. The controller 440 of the removable memory card 400 (CARD4) is operatively positioned between the memory 460 and the physical layer 410.

The controllers 140, 240, 340 and 440 are responsive to commands generated by the host 500, and control/manage read and write operations of the respectively memories 160, 260, 360 and 460. In addition, each controller 140, 240, 340 and 440 is equipped with a Card Identification (CID) register and a Relative Card Address (RCA) register. In particular, the controller 140 includes a CID register 142 and an RCA register 144. The controller 240 includes a CID register 242 and an RCA register 244. The controller 340 includes a CID register 342 and an RCA register 344. The controller 440 includes a CID register 442 and an RCA register 444. As will be explained in greater detail later, the CID contains information such as memory capacity, manufacturer, serial number, and so on, associated with the particular memory card, while the RCA is a default card address which is stored in advance by the manufacturer of the memory card.

Figure 2:
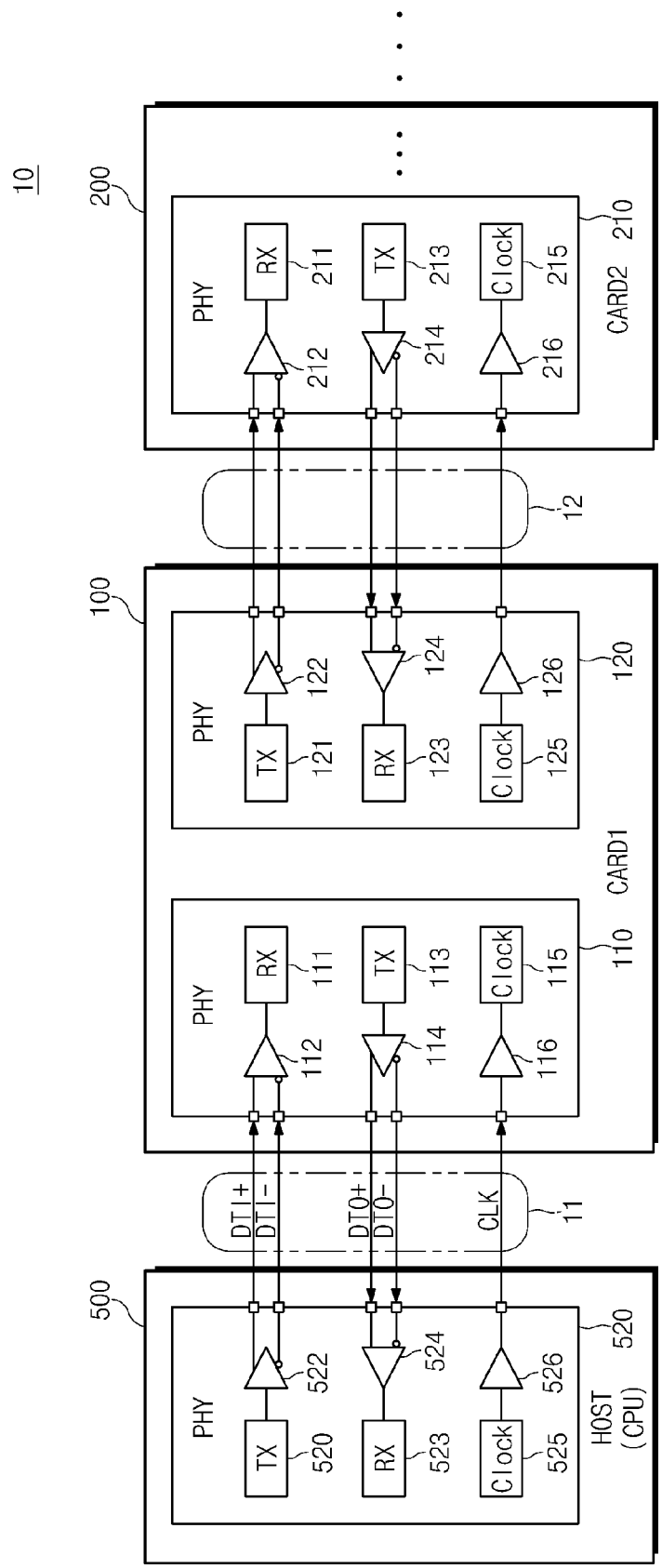
FIG. 2 illustrates physical layers of the memory system of FIG. 1 according to an embodiment of the present invention.

The physical layers (PHY) shown in FIG. 1 will now be described in more detail with reference to FIG. 2. That is, FIG. 2 illustrates the physical layers (PHY) 520, 110, 120 and 210 of FIG. 1. The remaining physical layers (PHY) 220, 310, 320 and 410 of FIG. 1 are similarly configured.

In the example of FIG. 2, each of the physical layers (PHY) includes a transmitter TX, a receiver RX, a clock generator Clock, and drive circuits. In particular, the physical layer 520 of the host 500 includes a transmitter TX 520 coupled to a differential signal driver 522, a receiver RX 523 coupled to a differential signal driver 524, and a clock generator 525 coupled to a signal driver 526. The physical layer 110 of the memory card 100 includes a transmitter TX 113 couple to a differential signal driver 114, a receiver RX 111 coupled to a differential signal driver 112, and a clock generator 115 coupled to a signal driver 116. As shown in FIG. 2, the bus 11 includes signal lines for transmitting differential signals (DT1+ and DT1−) from the physical layer 520 of the host 500 to the physical layer 110 of the memory card 100, signal lines for transmitting differential signals (DT0+ and DT0−) from the physical layer 110 of the memory card 100 to the physical layer 520 of the host 500, and signal line for transmitting a clock signal CLK from the physical layer 520 of the host 500 to the physical layer 110 of the memory card 100.

As is also shown in FIG. 2, the physical layer 120 of the memory card 100 includes a transmitter TX 121 couple to a differential signal driver 122, a receiver RX 123 coupled to a differential signal driver 124, and a clock generator 125 coupled to a signal driver 126. The physical layer 210 of the memory card 200 includes a transmitter TX 213 couple to a differential signal driver 214, a receiver RX 211 coupled to a differential signal driver 212, and a clock generator 215 coupled to a signal driver 216. The bus 12 includes signal lines for transmitting differential signals from the physical layer 120 of the of the memory card 100 to the physical layer 210 of the memory card 200, signal lines for transmitting differential signals from the physical layer 210 of the memory card 200 to the physical layer 120 of the memory card 100, and signal line for transmitting a clock signal CLK from the physical layer 120 of the memory card 100 to the physical layer 210 of the memory card 200.

The utilization of differential signal lines for transmitting data allows for high transmission speeds at relatively low power and low electromagnetic interference (EMI).

Figure 3:
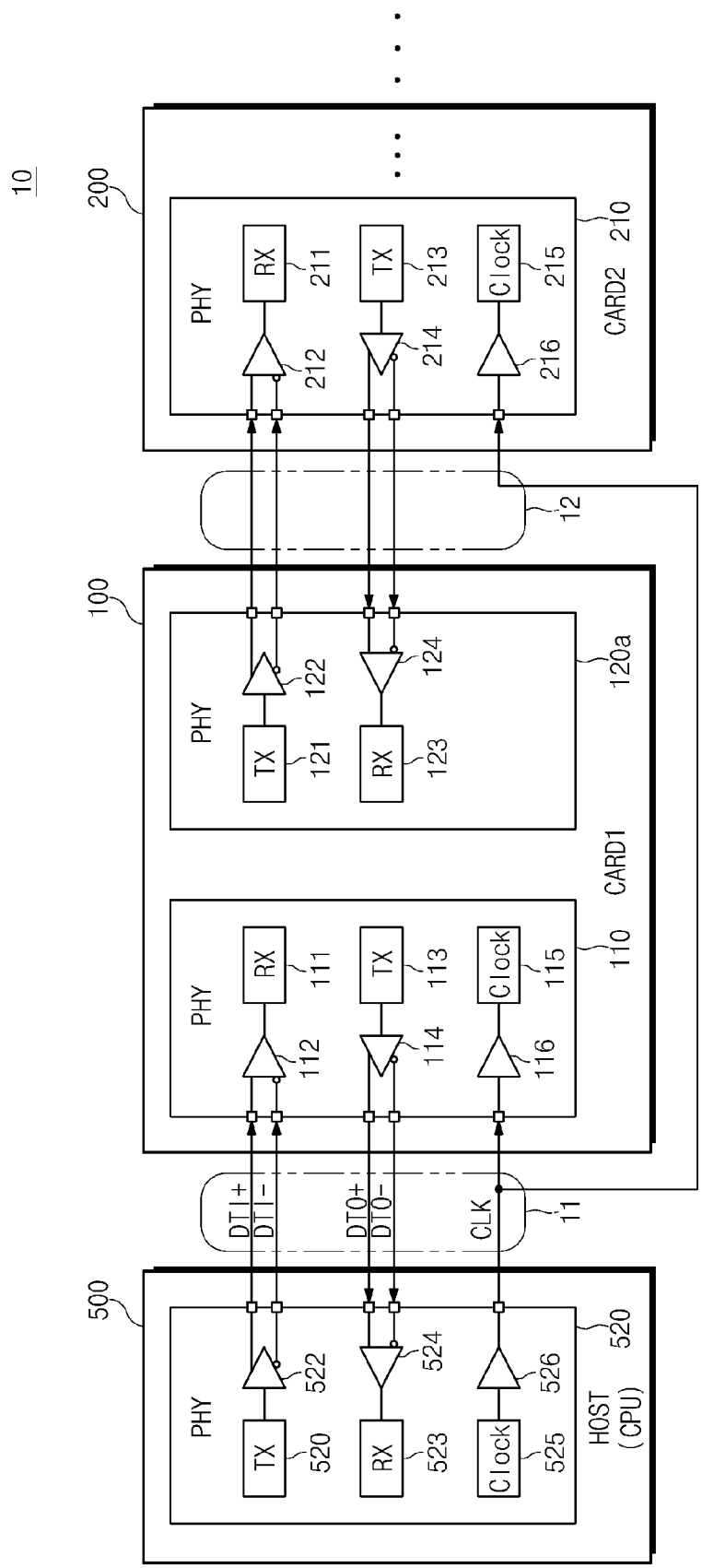
FIG. 3 illustrates physical layers of the memory system of FIG. 1 according to another embodiment of the present invention.

In the example of FIG. 2, the clock signal CLK is initially supplied by the host 500, and then regenerated in a cascade manner at each of the memory cards 100, 200 and 300. FIG. 3 illustrates an alternative embodiment in which the clock signal CLK is supplied in parallel from the host 500 to each of the memory cards 100, 200, 300 and 400. In this case, the physical layer 120a is not equipped with a clock generator and corresponding driver. Likewise, the physical layers 220 and 320 of FIG. 1 would also not be equipped with a clock generator and corresponding driver.

An operation of the memory system illustrated in FIG. 1 will now be described with reference to the flow diagram of FIG. 4.

Figure 4:
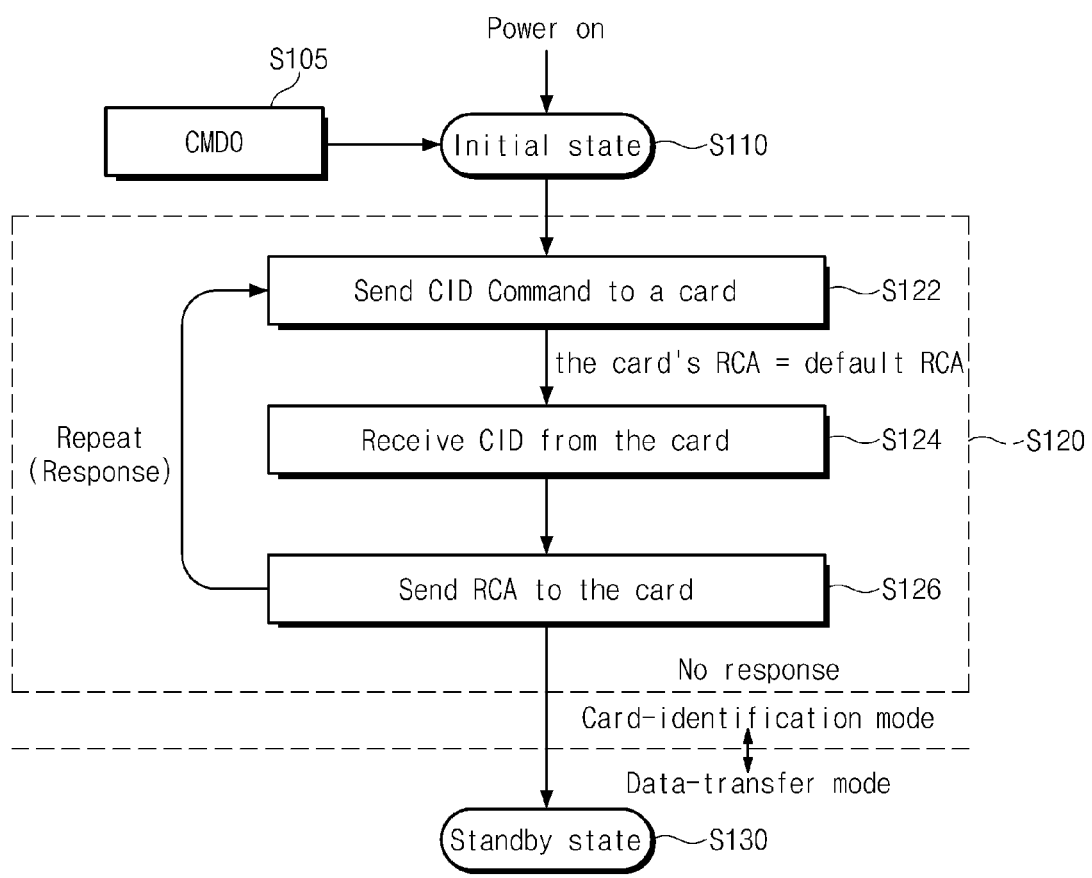
FIG. 4 illustrates a flow chart for describing a method of operating the memory system of FIG. 1 according to an embodiment of the present invention.

In particular, FIG. 4 illustrates a card identification mode S120 which occurs after the memory system is initialed (S110) in response to a power-on condition or in response to a reset command CMD0 (S105).

In the card identification mode S120, the host 500 sends a CID Command to the memory card 100 (S122). The CID command includes a card address, namely, a default RCA.

As will be explained in more detail later, the RCA of all of the memory cards 100, 200, 300 and 400 is initially set to the same default RCA (for example, a stored logic value of "111").

The card 100 receives the CID Command, and compares the RCA thereof with the RCA stored in the RCA register 144. Since both the RCA of the CID Command and the RCA stored in the RCA register 144 are the same default RCA, an address match occurs and the memory card 100 sends the CID information (stored in the CID register 142) to the host 500. The CID of the memory card 100 is thus received by the host 500 (S124).

After receiving the CID from the memory card 100, the host 500 then transmits an RCA Command which includes the default RCA to the memory card 100 (S126). The card 100 receives the RCA Command, and compares the RCA thereof with the RCA stored in the RCA register 144. Since both the RCA of the RCA Command and the RCA stored in the RCA register 144 are the same default RCA, an address match occurs. As such, the memory card 100 is responsive to the RCA Command to store a new RCA (which is different from the default RCA) in the RCA register 144. Once the new RCA is stored in the register 144, the memory card 100 sends an acknowledgment to the host 500.

Upon receipt of the acknowledgment, the host 500 again transmits the CID Command with the default RCA to the memory card 100 (S122). The card 100 receives the CID Command, and compares the RCA thereof with the RCA stored in the RCA register 144. However, since the RCA stored in the RCA register 144 has changed, an address mismatch occurs and the memory card 100 transmits the CID command to the memory card 200.

The card 200 receives the CID Command, and compares the RCA thereof with the RCA stored in the RCA register 244. Since both the RCA of the CID Command and the RCA stored in the RCA register 244 are the same default RCA, an address match occurs and the memory card 200 sends the CID information (stored in the CID register 242) to the host 500 via the memory card 100. The CID of the memory card 200 is thus received by the host 500 (S124).

After receiving the CID from the memory card 200, the host 500 then transmits an RCA Command which includes the default RCA to the memory card 100 (S126). The card 100 receives the RCA Command, and compares the RCA thereof with the RCA stored in the RCA register 144. Since an address mis-match occurs, the card 100 transmits the RCA Command to the memory card 200.

The card 200 receives the RCA Command, and compares the RCA thereof with the RCA stored in the RCA register 244. Since both the RCA of the RCA Command and the RCA stored in the RCA register 244 are the same default RCA, an address match occurs. As such, the memory card 200 is responsive to the RCA Command to store a new RCA (which is different from the default RCA and the RCA set in the memory card 100) in the RCA register 244. Once the new RCA is stored in the register 244, the memory card 200 sends an acknowledgment to the host 500 via the first memory card 100.

The process described above (S120) is then repeated in order to set (or overwrite) the RCA stored in the RCA registers 342 and 442 of the memory cards 300 and 400, respectively. In particular, the default RCA stored in RCA register 342 is changed to a unique RCA address, and then the default RCA stored in the RCA register 442 is changed to another unique RCA address.

At such time that the host 500 fails to receive an acknowledgment after transmitting a CID Command with the default RCA, the card identification mode S120 is deemed complete, a normal data-transfer mode is executed, and eventually the memory system is placed in a standby state (S130).

Figure 5:
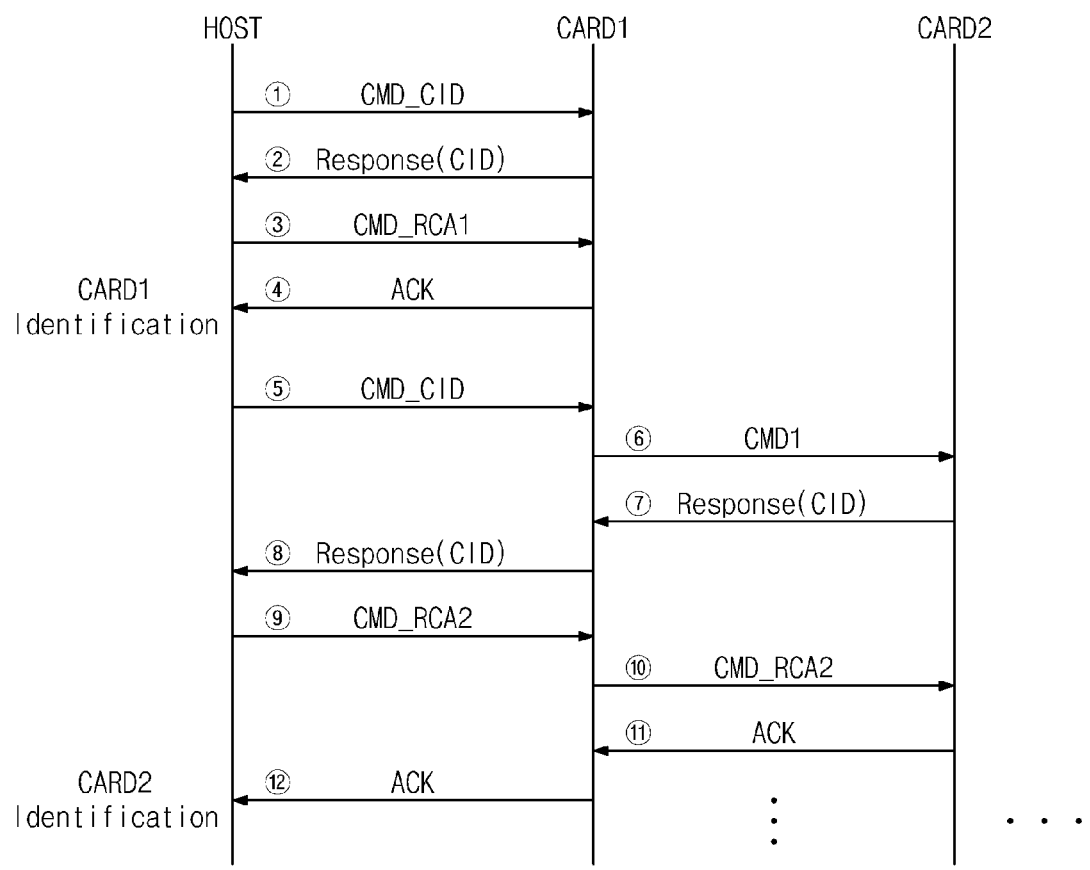
FIG. 5 illustrates a command diagram of the memory system of FIG. 1 according to an embodiment of the present invention.

FIG. 5 illustrates a command diagram corresponding to the operation described above in connection with FIG. 5. At circle-1, the CID Command (CMD_CID) is transmitted from the host to the memory card 100 (CARD1). At circle-2, since the CARD1 contains the default RCA, the CARD1 sends a response to the host containing CID information. At circle-3, the host transmits a first RCA command (CMD_RCA1). At circle-4, since the CARD1 contains the default RCA, the CARD1 changes the default RCA stored in the register 142 with the new RCA1 of the CMD_RCA1, and sends an acknowledgment to the host. At this time, identification of CARD1 is complete.

At circle-5, the host again transmits the CMD_CID to the CARD1. Since the RCA1 of CARD1 is different than the default RCA, the CMD_CID is then passed onto to CARD2 at circle-6 of FIG. 5. At circle-7, since the CARD2 contains the default RCA, the CARD2 sends a response to the host containing CID information via the CARD1 (circle-8). At circle-9, the host transmits a second RCA command (CMD_RCA2) to the CARD1. Since the RCA1 of CARD1 is different than the default RCA, the CMD_RCA2 is then passed onto to CARD2 at circle-10. At circle-11, since the CARD2 contains the default RCA, the CARD2 changes the default RCA stored in the register 242 with the new RCA2 of the CMD_RCA2, and sends an acknowledgment to the host via the CARD1 (circle-12). At this time, identification of CARD2 is complete.

The process described above in connection with FIG. 5 is then repeated to complete the identification process of CARD3 and CARD4.

FIGS. 6, 7 and 8 illustrate examples of command, response and data tokens, respectively, which may be transmitted in the memory system of FIG. 1. The command token (64 bits) is generated by the host 500, the response token (32 bits) is generated by the memory cards 100, 200, 300 and 400, the data token is transmitted to and from the host 500 and the memories contained in the memory cards 100, 200, 300 and 400.

As shown, the command token of the example of FIG. 6 includes a 1-bit Start Bit, a 1-bit Transmission section, a 1-bit Data/Command section, a 3-bit RCA section, a 9-bit CMD (command) index, a 32-bit Argument section, a 9-bit Reserved section, a 7-bit CRC7 section, and a 1-bit End Bit. The Response token of the example of FIG. 7 includes a 1-bit Start Bit, a 1-bit Transmission section, a 1-bit Data/Response section, a 3-bit RCA section, a 9-bit CMD (command) index, a 1-bit Busy-Bit, a 1-bit Error Bit, a 7-bit Card Status Error section, a 7-bit CRC7 section, and a 1-bit End Bit. The Data token of the example of FIG. 8 includes a 1-bit Start Bit, a 1-bit Transmission section, a 1-bit Data/Command section, a 3-bit RCA section, a 22-bit Packet Information section, a 512-byte Sector DATA section, a 16-bit CRC16 section, and a 1-bit End Bit.

Those skilled in the art will understand the utility of each data section of the token shown in FIGS. 6 through 8. It is noted, however, that the Transmission bit specifies the direction of data transmission. For example, a Transmission bit of "1" might specify transmission of data from the host to a memory card, and a Transmission bit "0" might specify transmission of data from a memory card to the host. Also, the CRC (cyclic redundancy check) sections are utilized for error correction.

FIG. 9 illustrates examples of the 3-bit RCA that may be utilized in one or more embodiments of the present invention. As shown, the default RCA that is initially set in each of the memory cards is "111". Then, by executing the process described above in connection with FIGS. 4 and 5, the RCA of the memory cards is successfully changed to "000", "001", "010" and "011", respectively.

As described above, each of the embedded memory cards 100, 200 and 300, and the removable memory card 400, initially contain the default RCA (e.g., "111"). The host 500 utilizes the default RCA to issue commands to read CID information and to then successively change the default RCA to a unique non-default RCA. As such, the RCA of the removable memory card 400 can be readily assigned, even in the absence of one or more of the memory cards 100, 200 and 300.

A memory system according to another embodiment of the present invention will now be described with reference to FIG. 10. As shown, the memory system 20 of this example includes a host unit 501, one or more embedded memory cards 101, 201 and 301, and a removable memory card 401. The removable card 401 is removably attached to the memory system 20 by way of a card socket 422.

The memory cards 101, 201, 301 and 401 are cascade connected to the host 501. In particular, a bus 21 is connected between physical layers (PHY) 521 and 111 of the host 501 and memory card 101 (CARD1), respectively. A bus 22 is connected between physical layers (PHY) 121 and 211 of the memory card 101 (CARD1) and memory card 201 (CARD2), respectively. A bus 23 is connected between physical layers (PHY) 221 and 311 of the memory card 201 (CARD2) and memory card 301 (CARD3), respectively. A bus 24 is connected between physical layers (PHY) 321 and 411 of the memory card 301 (CARD3) and memory card 401 (CARD4), respectively.

Each of the embedded memory cards 101, 201 and 301 includes a memory 161, 261 and 361, respectively (MEMORY1, MEMORY2 and MEMORY3). The memories 161, 261 and 361 may be configured of volatile, non-volatile memory or a combination thereof. Non-limiting examples of volatile memory include RAM, SRAM, DRAM, EDORAM (Enhanced Data Output RAM), High-Speed DRAM, SDRAM, and DDR-SDRAM. Non-limiting examples of non-volatile memory include ROM, EEPROM, Flash Memory, MRAM, PRAM and FRAM.

The removable memory card 401 also includes a memory 461 (MEMORY4), which may be a non-volatile memory such as ROM, EEPROM, Flash Memory, MRAM, PRAM and/or FRAM.

The memory cards 101, 201, 301 and 401 are further equipped with controllers 141, 241, 341 and 441 respectively. In particularly, the controller 141 of the embedded memory card 100 (CARD1) is operatively positioned between the memory 160 and the physical layers 111 and 121. The controller 241 of the embedded memory card 201 (CARD2) is operatively positioned between the memory 261 and the physical layers 211 and 221. The controller 341 of the embedded memory card 301 (CARD3) is operatively positioned between the memory 361 and the physical layers 311 and 321. The controller 441 of the removable memory card 401 (CARD4) is operatively positioned between the memory 461 and the physical layer 411.

The controllers 141, 241, 341 and 441 are responsive to commands generated by the host 501, and control/manage read and write operations of the respectively memories 161, 261, 361 and 461. In addition, each controller 141, 241, 341 and 441 is equipped with a Card Identification/Partition (CID/PI) register and a Relative Card Address (RCA) register. In particular, the controller 141 includes a CID/PI register 143 and an RCA register 145. The controller 241 includes a CID/PI register 243 and an RCA register 245. The controller 341 includes a CID/PI register 343 and an RCA register 345. The controller 441 includes a CID/PI register 443 and an RCA register 445. As will be explained in greater detail later, the CID/PI register contains CID information such as memory capacity, manufacturer, serial number, and so on, associated with the particular memory card, and partition (PI) information related to the manner in which the memory of the corresponding memory card is partitioned. As with the first embodiment, the RCA is initially a default card address which may be stored in advance by the manufacturer of the memory card.

Figure 10:
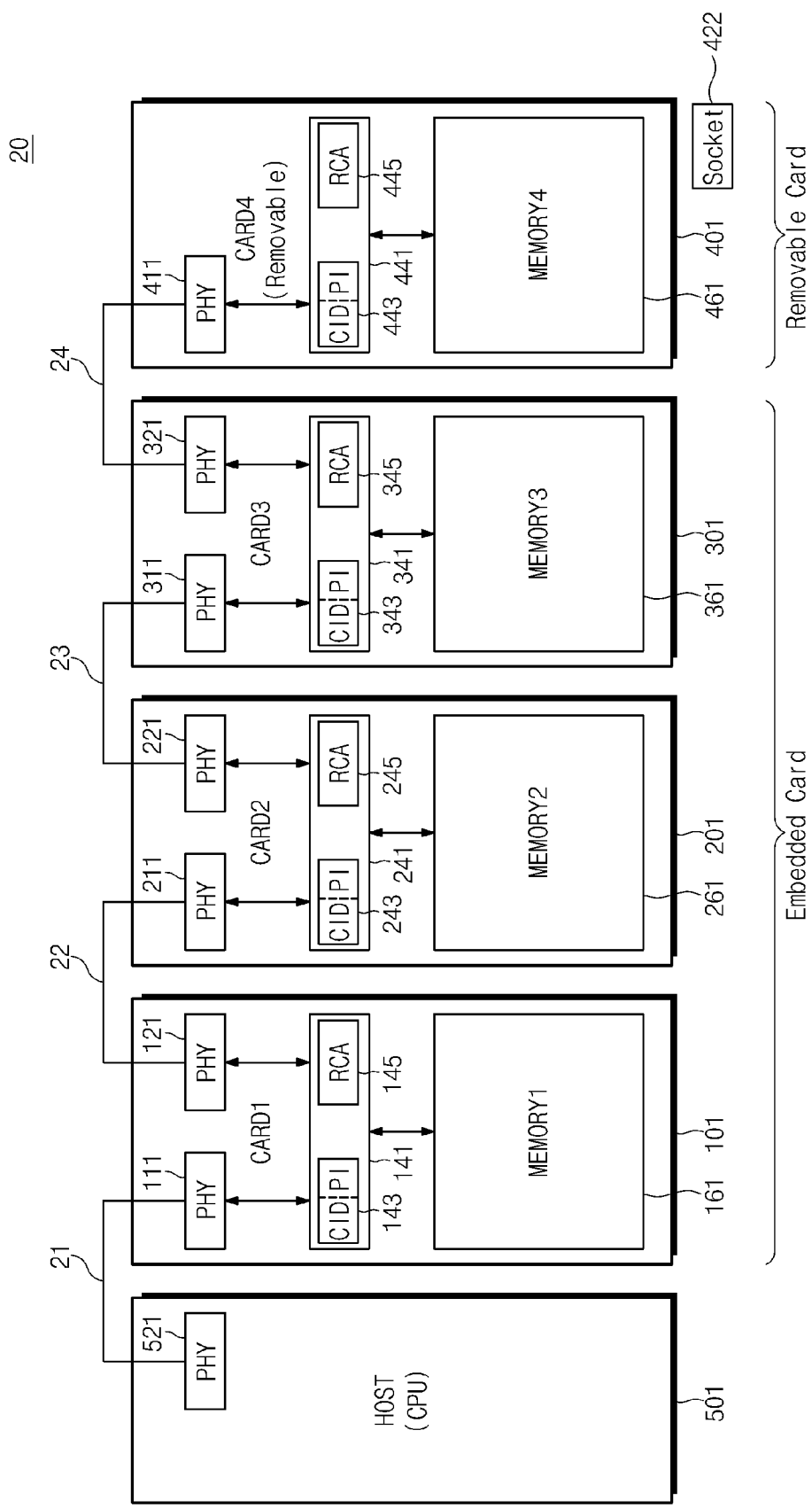
FIG. 10 illustrates a memory system according to another embodiment of the present invention.

The physical layers (PHY) shown in FIG. 10 may be the same as those described previously in connection with FIGS. 2 and 3.

Figure 11:
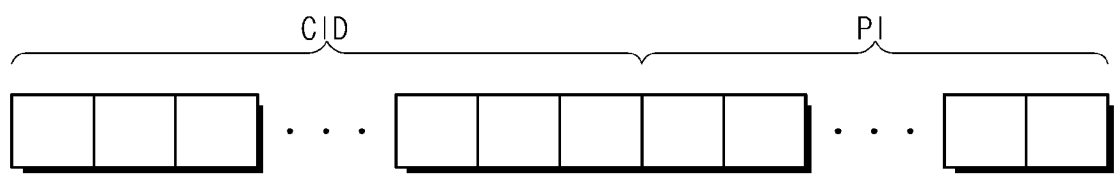
FIG. 11 illustrates the data structure of an information register of the memory system of FIG. 10 according to an embodiment of the present invention.
Figure 12:
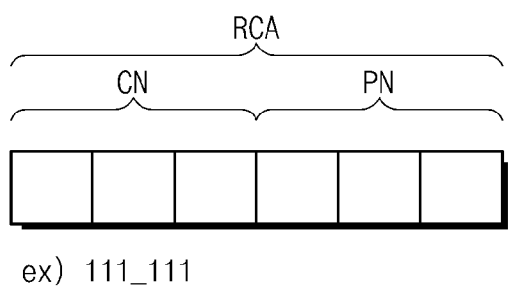
FIG. 12 illustrates the data structure of an address register of the memory system of FIG. 10 according to an embodiment of the present invention.

The CID/PI register and RCA register of each memory controller are illustrated in FIGS. 11 and 12, respectively.

As shown in FIG. 11, the CID/PI register of each memory controller includes CID bits denoting the CID of each corresponding memory card, and PI bits denoting the partitioning of the memory of each memory card. That is, the PI is software information determined by the user, and is utilized to inform the host 501 the manner in which the memory card is logically partitioned.

The RCA register includes a Card Number (CN) which denotes the address of the memory card, and a Partition Number (PN) which denotes a partition address within the same memory card. For example, a default RCA may be 111111, while the non-default RCA for the second partition of the first memory card may be 000001. This example will be discussed again later with reference to FIG. 17.

FIGS. 13, 14 and 15 illustrate examples of command, response and data tokens, respectively, which may be transmitted in the memory system of FIG. 10. The command token (64 bits) is generated by the host 501, the response token (32 bits) is generated by the memory cards 101, 201, 301 and 401, the data token is transmitted to and from the host 501 and the memories contained in the memory cards 101, 201, 301 and 401.

As shown, the command token of the example of FIG. 13 includes a 1-bit Start Bit, a 1-bit Transmission section, a 1-bit Data/Command section, a 6-bit RCA section, a 6-bit CMD index, a 32-bit Argument section, a 9-bit Reserved section, a 7-bit CRC7 section, and a 1-bit End Bit. The Response token of the example of FIG. 14 includes a 1-bit Start Bit, a 1-bit Transmission section, a 1-bit Data/Response section, a 6-bit RCA section, a 6-bit CMD index, a 1-bit Busy-Bit, a 1-bit Error Bit, a 7-bit Card Status Error section, a 7-bit CRC7 section, and a 1-bit End Bit. The Data token of the example of FIG. 15 includes a 1-bit Start Bit, a 1-bit Transmission section, a 1-bit Data/Command section, a 6-bit RCA section, a 22-bit Packet Information section, a 512-byte Sector DATA section, a 16-bit CRC16 section, and a 1-bit End Bit.

Figure 16:
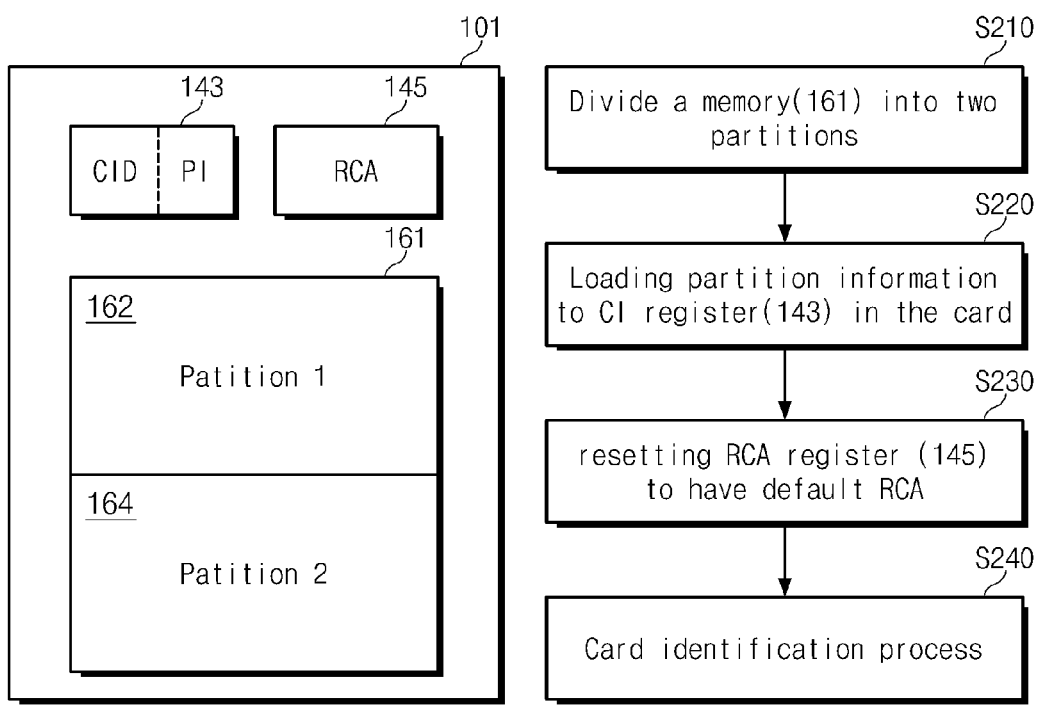
FIG. 16 illustrates a flow chart for describing the partition of a memory card of the memory system of FIG. 10 according to an embodiment of the present invention.

Reference is now made to FIG. 16 for describing the partitioning of a memory card of the memory system of FIG. 10. In this example, the first memory card 101 is divided into two partitions 162 and 164 (S210). Corresponding partition information (PI) is then loaded into the CID/PI register 143 of the memory card 101 (S220), and the RCA register 145 is reset to the default RCA (S230). The host 501 then executes a card identification process (S240), and example of which is described later with reference to FIG. 18.

FIG. 17 illustrates examples of RCA data stored in the RCA registers of the memory cards (CARDS 1~4) of the memory system of FIG. 10. In this example, the default RCA is set at 111111. The non-default and card-specific RCA also includes six bits, where the most significant three bits denote the memory card, and the least significant three bits denote a partition (if any) of the memory card. In this example, the first memory card is partitioned, and the RCA of the partitions is 000000 and 000001, respectively. The RCA of the remaining non-partitioned memory cards is 001000, 010000 and 011000, respectively.

Figure 18:
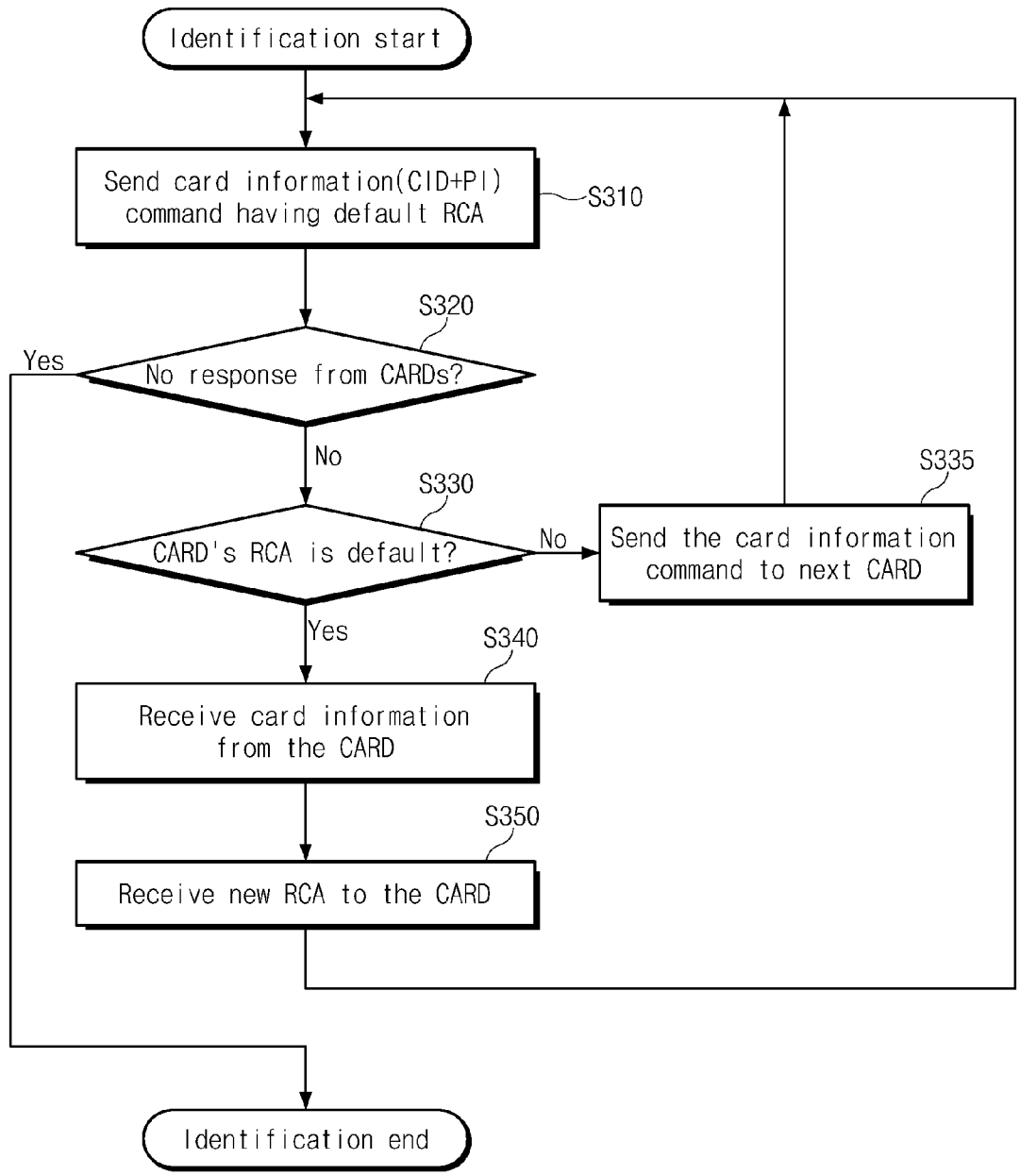
FIG. 18 illustrates a flow chart for describing a method of operating the memory system of FIG. 10 according to an embodiment of the present invention

A method of operating the memory system of FIG. 10 will now be described with reference to the flow diagram of FIG. 18. In particular, FIG. 18 illustrates a process in which the host 501 of the memory system identifies the memory cards 101, 201, 301 and 401.

Initially, the host 501 sends a CID/PI command having the default RCA (e.g., 111111 as shown in FIG. 17) (S310). If no response is received (S320), the card identification process is complete. Otherwise, the first memory card 101 compares the RCA (or RCA's) stored in the register 145 with the default RCA of the CID/PI command (S530). In the case of a match, the first memory card 101 transmits the CID/PI information to the host 501 (S340), and this host 501 responds by sending a non-default RCA to the card that is unique to the card (or partition within the card) (S350). In the case where the stored RCA (or RCA's) of the first memory card 101 does not match the default RCA of the CID/PI command, the command is pass on to the second memory card 201 (S335). The process is then repeated for each of the memory cards 201, 301 and 401, until the non-default RCA's for each memory card (or partition) have been stored in the RCA registers of each memory card.

Thus, the embodiment of FIG. 10 operates similarly to that of previously described FIG. 1. Each of the embedded memory cards 101, 201 and 301, and the removable memory card 401, initially contain the default RCA (e.g., "111111"). The host 501 utilizes the default RCA to issue commands to read CID/PI information and to then successively change the default RCA to a unique non-default RCA. As such, the RCA of the removable memory card 401 can be readily assigned, even in the absence of one or more of the memory cards 101, 201 and 301.

A memory system according to another embodiment of the present invention will now be described with reference to FIG. 19. As shown, the memory system 30 of this example includes a host unit 502, one or more embedded memory cards 102, 202 and 302, and a removable memory card 402. The removable card 402 is removably attached to the memory system 30 by way of a card socket 423.

The memory cards 102, 202, 302 and 402 are cascade connected to the host 502. In particular, a bus 31 is connected between physical layers (PHY) 522 and 112 of the host 502 and memory card 102 (CARD1), respectively. A bus 32 is connected between physical layers (PHY) 122 and 212 of the memory card 102 (CARD1) and memory card 202 (CARD2), respectively. A bus 33 is connected between physical layers (PHY) 222 and 312 of the memory card 202 (CARD2) and memory card 302 (CARD3), respectively. A bus 34 is connected between physical layers (PHY) 322 and 412 of the memory card 302 (CARD3) and memory card 402 (CARD4), respectively.

Each of the embedded memory cards 102, 202 and 302 includes a memory 162, 262 and 362, respectively (MEMORY1, MEMORY2 and MEMORY3). The memories 162, 262 and 362 may be configured of volatile, non-volatile memory or a combination thereof. Non-limiting examples of volatile memory include RAM, SRAM, DRAM, EDORAM (Enhanced Data Output RAM), High-Speed DRAM, SDRAM, and DDR-SDRAM. Non-limiting examples of non-volatile memory include ROM, EEPROM, Flash Memory, MRAM, PRAM and FRAM.

The removable memory card 402 also includes a memory 462 (MEMORY4), which may be a non-volatile memory such as ROM, EEPROM, Flash Memory, MRAM, PRAM and/or FRAM.

The memory cards 102, 202, 302 and 402 are further equipped with controllers 150, 250, 350 and 450, respectively. In particularly, the controller 150 of the embedded memory card 102 (CARD1) is operatively positioned between the memory 162 and the physical layers 112 and 122. The controller 250 of the embedded memory card 202 (CARD2) is operatively positioned between the memory 262 and the physical layers 212 and 222. The controller 350 of the embedded memory card 302 (CARD3) is operatively positioned between the memory 362 and the physical layers 312 and 322. The controller 450 of the removable memory card 402 (CARD4) is operatively positioned between the memory 462 and the physical layer 412.

The controllers 150, 250, 350 and 450 are responsive to commands generated by the host 502, and control/manage read and write operations of the respectively memories 162, 262, 362 and 462. In addition, each controller 150, 250, 350 and 450 is equipped with a Relative Card Address (RCA) register. In particular, the controller 150 includes an RCA register 145. The controller 250 includes an RCA register 245. The controller 350 includes an RCA register 345. The controller 450 includes an RCA register 445.

As with the first embodiment, the RCA registers initially store a default card address (default RCA) which may be stored in advance by the manufacturer of the respective memory cards.

Figure 19:
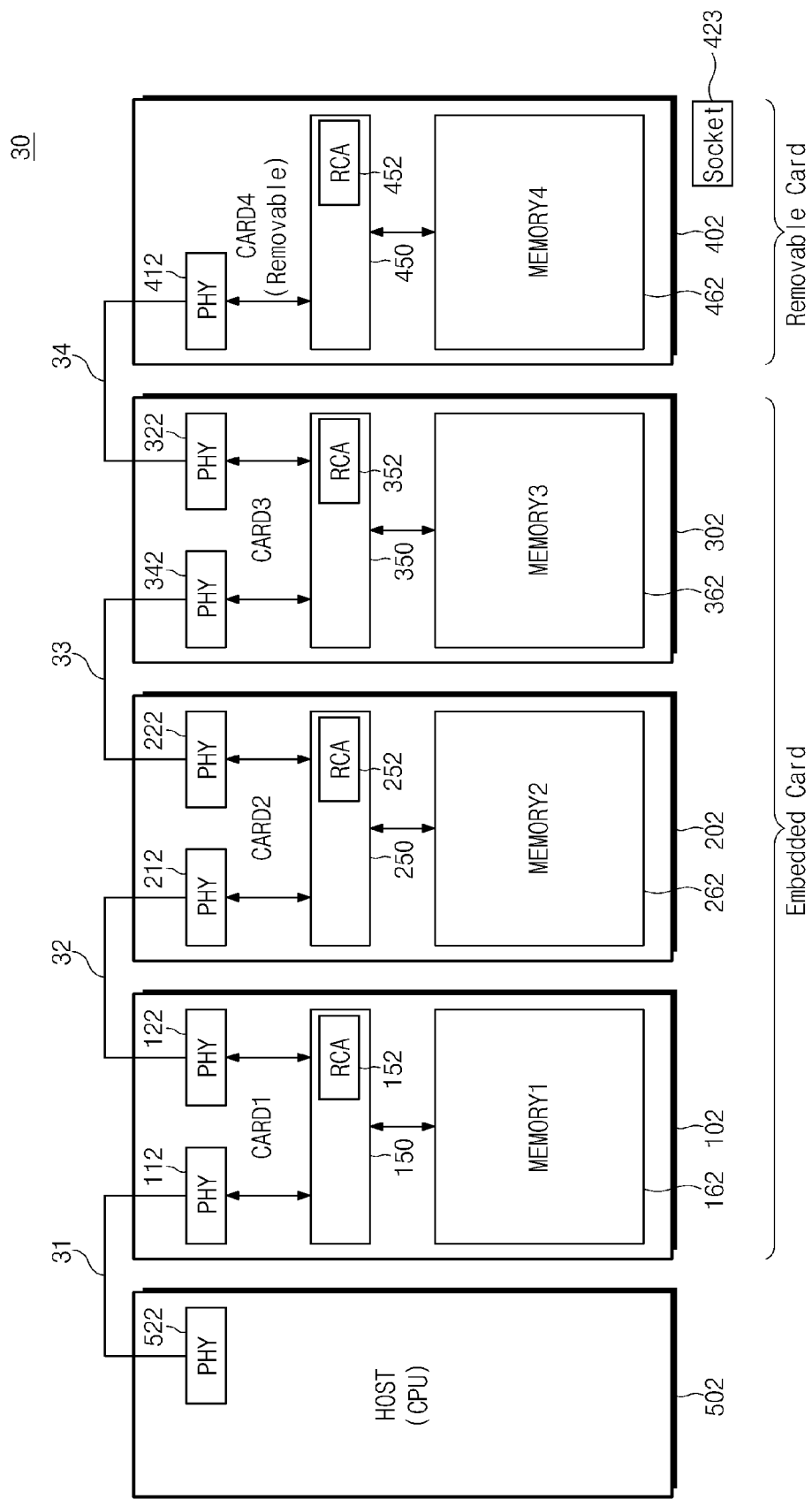
FIG. 19 illustrates a memory system according to another embodiment of the present invention.

The physical layers (PHY) shown in FIG. 19 may be the same as those described previously in connection with FIGS. 2 and 3.

The operation of the memory system of FIG. 19 is similar to that of previously described FIG. 1, except that the card identification process is omitted. Instead, upon initialization (power-on or reset), the host 502 sequentially changes the pre-stored default RCA of each memory card to a non-default RCA that is unique to each card. This is shown in part by the command diagram of FIG. 20.

Figure 20:
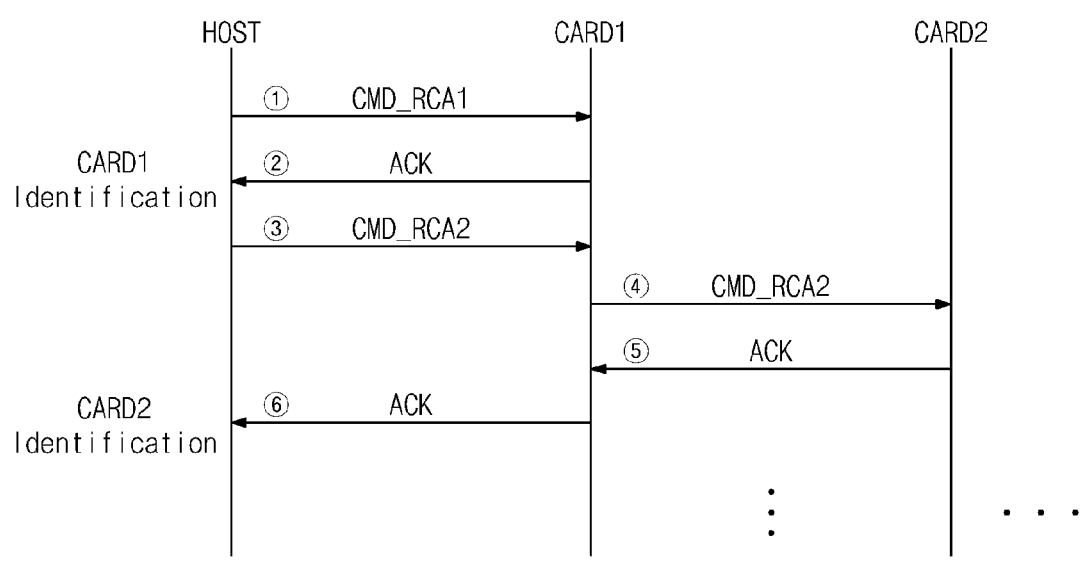
FIG. 20 illustrates a command diagram of the memory system of FIG. 19 according to an embodiment of the present invention.

Referring to FIG. 20, at circle-1, the host 502 sends an RCA command (CMD_RCA1) containing the default RCA to the first memory card 102. Since the RCA stored in the first memory card 102 is the same as the default RCA included the RCA command, the first memory card 102 is responsive to the command to store a new RCA in the register 145 thereof, and to send an acknowledgment back to the host 502 at circle-2. At circle-3 of FIG. 20, the host 502 sends an RCA command (CMD_RCA2) containing the default RCA to the first memory card 102. Since the RCA stored in the first memory card 102 is different than the default RCA included the RCA command, the first memory card 102 passes the RCA command to the second memory card 202 at circle-4. Since the RCA stored in the second memory card 202 is the same as the default RCA included the RCA command, the second memory card 202 is responsive to the command to store a new RCA in the register 245 thereof, and to send an acknowledgment back to the host 502 at circle-5. The acknowledgment is relayed back to the host 502 via the first memory card 102 at circle-6 of FIG. 20.

Figure 21:
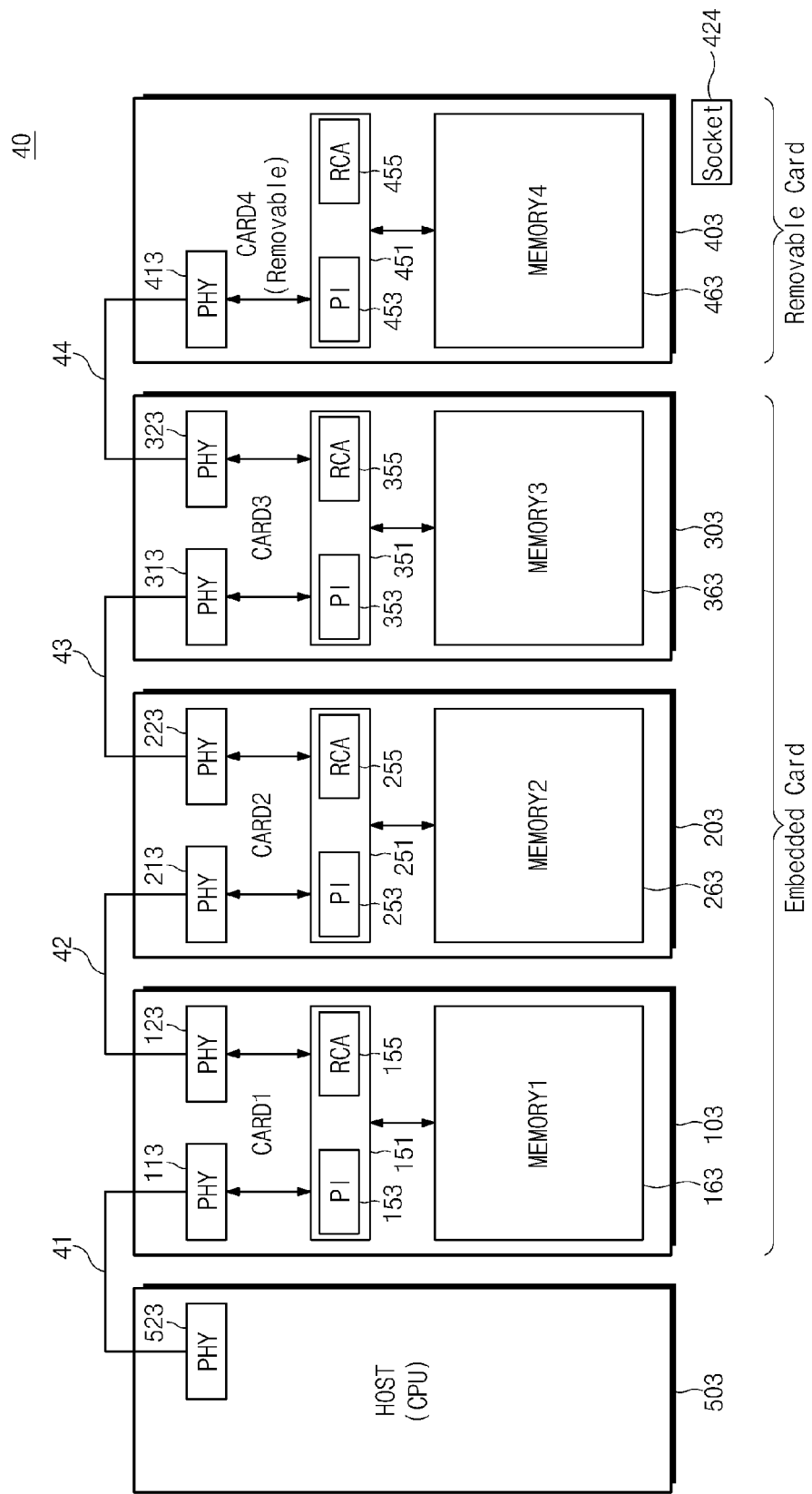
FIG. 21 illustrates a memory system according to another embodiment of the present invention.

FIG. 21 illustrates a memory system 40 according to an embodiment of the present invention. As shown, the memory system 40 of this example includes a host unit 503, one or more embedded memory cards 103, 203 and 303, and a removable memory card 403. The removable card 403 is removably attached to the memory system 10 by way of a card socket 424.

The memory cards 103, 203, 303 and 403 are cascade connected to the host 503. In particular, a bus 41 is connected between physical layers (PHY) 523 and 113 of the host 503 and memory card 103 (CARD1), respectively. A bus 42 is connected between physical layers (PHY) 123 and 213 of the memory card 103 (CARD1) and memory card 203 (CARD2), respectively. A bus 43 is connected between physical layers (PHY) 220 and 313 of the memory card 203 (CARD2) and memory card 303 (CARD3), respectively. A bus 44 is connected between physical layers (PHY) 323 and 413 of the memory card 303 (CARD3) and memory card 403 (CARD4), respectively.

Each of the embedded memory cards 103, 203 and 303 includes a memory 163, 263 and 363, respectively (MEMORY1, MEMORY2 and MEMORY3). The memories 163, 263 and 363 may be configured of volatile, non-volatile memory or a combination thereof. Non-limiting examples of volatile memory include RAM, SRAM, DRAM, EDORAM (Enhanced Data Output RAM), High-Speed DRAM, SDRAM, and DDR-SDRAM. Non-limiting examples of non-volatile memory include ROM, EEPROM, Flash Memory, MRAM, PRAM and FRAM.

The removable memory card 403 also includes a memory 463 (MEMORY4), which may be a non-volatile memory such as ROM, EEPROM, Flash Memory, MRAM, PRAM and/or FRAM.

The memory cards 103, 203, 303 and 403 are further equipped with controllers 151, 251, 351 and 451, respectively. In particularly, the controller 151 of the embedded memory card 103 (CARD1) is operatively positioned between the memory 163 and the physical layers 113 and 123. The controller 251 of the embedded memory card 203 (CARD2) is operatively positioned between the memory 263 and the physical layers 213 and 223. The controller 351 of the embedded memory card 303 (CARD3) is operatively positioned between the memory 363 and the physical layers 313 and 323. The controller 451 of the removable memory card 403 (CARD4) is operatively positioned between the memory 463 and the physical layer 413.

The controllers 151, 251, 351 and 451 are responsive to commands generated by the host 503, and control/manage read and write operations of the respectively memories 163, 263, 363 and 463. In addition, each controller 151, 251, 351 and 451 is equipped with a Partition Identification (PI) register and a Relative Card Address (RCA) register. In particular, the controller 151 includes a CID register 153 and an RCA register 155. The controller 251 includes a CID register 253 and an RCA register 255. The controller 351 includes a CID register 353 and an RCA register 355. The controller 451 includes a CID register 453 and an RCA register 455. The PI register contains information relating to the partitioning (if any) of each corresponding memory 163, 262, 363 and 463, respectively, as discussed above in connection with the embodiment of FIG. 10. The RCA register contains a card address, and as will the previous embodiment, each RCA register initially contains a default card address which is stored in advance by the manufacturer of the memory card.

The physical layers (PHY) shown in FIG. 21 may be the same as those described previously in connection with FIGS. 2 and 3.

The operation of the memory system of FIG. 21 is similar to that of previously described FIG. 10, except that the card identification process is omitted. This is shown in part by the command diagram of FIG. 22.

Figure 22:
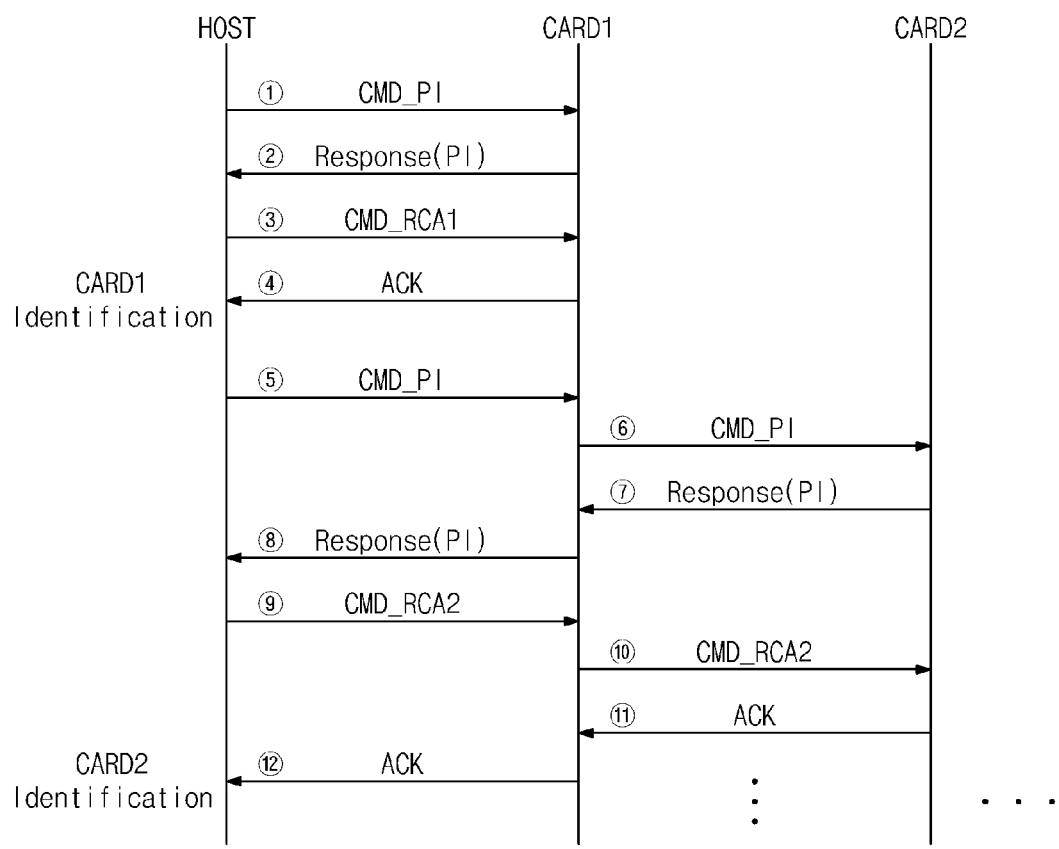
FIG. 22 illustrates a command diagram of the memory system of FIG. 21 according to an embodiment of the present invention.

FIG. 22 illustrates a command diagram associated with the memory system of FIG. 21. At circle-1, the PI Command (CMD_PI) is transmitted from the host 503 to the memory card 103 (CARD1). At circle-2, since the CARD1 contains the default RCA, the CARD1 sends a response to the host containing PI information. At circle-3, the host transmits a first RCA command (CMD_RCA1). At circle-4, since the CARD1 contains the default RCA, the CARD1 changes the default RCA stored in the register 155 with the new RCA1 of the CMD_RCA1, and sends an acknowledgment to the host. At this time, identification of CARD1 is complete.

At circle-5, the host again transmits the CMD_PI to the CARD1. Since the RCA1 of CARD1 is different than the default RCA, the CMD_PI is then passed onto to CARD2 at circle-6 of FIG. 22. At circle-7, since the CARD2 contains the default RCA, the CARD2 sends a response to the host containing PI information via the CARD1 (circle-8). At circle-9, the host transmits a second RCA command (CMD_RCA2) to the CARD1. Since the RCA1 of CARD1 is different than the default RCA, the CMD_RCA2 is then passed onto to CARD2 at circle-10. At circle-11, since the CARD2 contains the default RCA, the CARD2 changes the default RCA stored in the register 255 with the new RCA2 of the CMD_RCA2, and sends an acknowledgment to the host via the CARD1 (circle-12). At this time, identification of CARD2 is complete.

The process described above in connection with FIG. 22 is then repeated to complete the identification process of CARD3 and CARD4.

Figure 23:
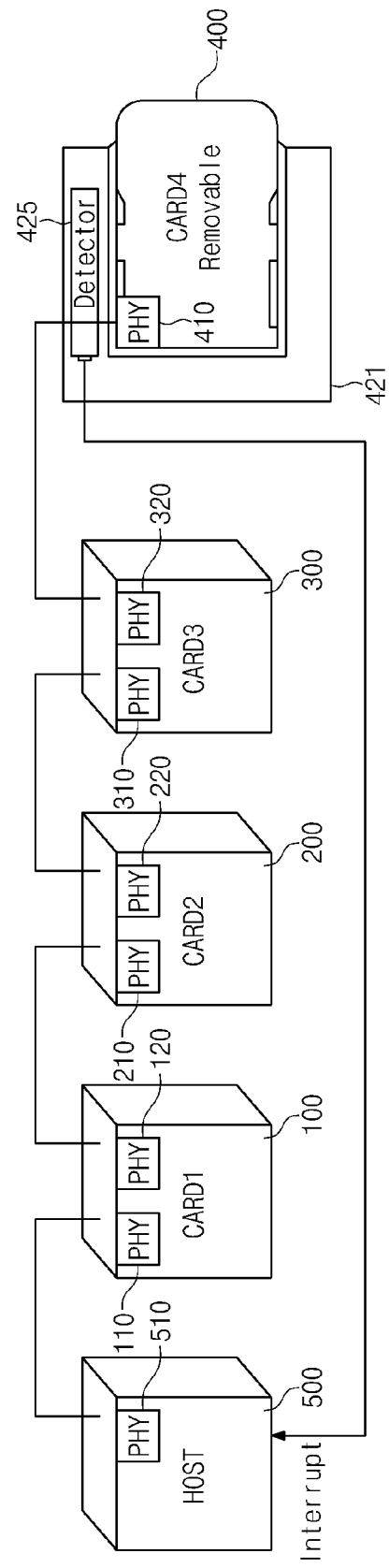
FIG. 23 illustrates a memory system with a removable card socket according to an embodiment of the present invention.

FIG. 23 is a perspective view of a memory system according to the embodiment of previously described FIG. 1. Like reference number denote like elements in the two figures, and accordingly, a detailed description of the operation of FIG. 23 is omitted here to avoid redundancy. It is noted, however, that the system of FIG. 23 is equipped with a detector 425 contained within the card socket 421. Upon insertion of the removal card 400 into the card socket 421, the detector 425 sends an interrupt signal to the host 500. The host 500 is responsive to the interrupt signal to initiate the card identification process described previously in connection with FIG. 4.

Figure 24:
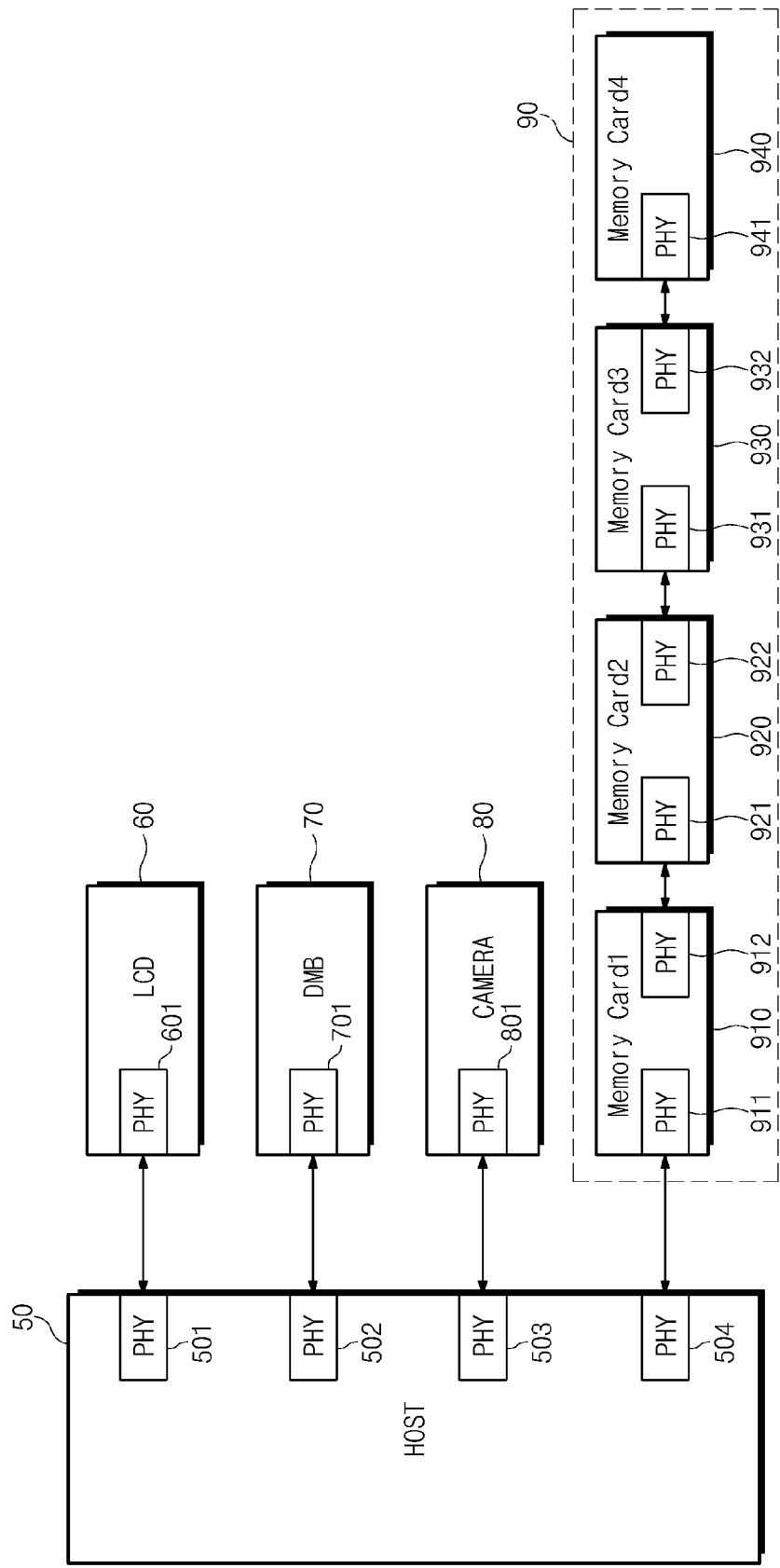
FIG. 24 illustrates a computer system which includes a memory system according to one or more embodiments of the present invention.

FIG. 24 illustrates a computer system incorporating a memory system of one or more embodiments of the present invention. The computer system of this example is a mobile communications device, such as a mobile telephone and/or mobile personal data assistant (PDA). As shown, the computer system includes a host 50 having a plurality of physical layers 501, 502, 503 and 504, which are respectively connected to a number of peripheral devices. The physical layer 501 is coupled to the physical layer 601 of a display (LCD) device 60. The physical layer 502 is connected to the physical layer 701 of a DMB (digital multimedia broadcasting) device 70. The physical layer 503 is coupled to the physical layer 801 of a camera 80. The physical layer 504 is coupled to the physical layer 911 of a memory 90.

The memory 90 includes a plurality of embedded memory cards 910, 920 and 930, and at least one removable memory card 940. The memory cards are cascade connected such that the physical layer 912 of memory card 910 is connected to the physical layer 921 of the memory card 920, the physical layer 922 of memory card 920 is connected to the physical layer 931 of the memory card 930, and the physical layer 32 of memory card 930 is connected to the physical layer 941 of the memory card 940. It will be understood that the interaction between the memory 90 and the host 80 is in accordance with any one or more of the previously described embodiments of the present invention.

Although the present invention has been described in connection with selected embodiments, it is not limited thereto. It will be apparent to those skilled in the art that various substitution, modifications and changes may be thereto without departing from the scope of the invention.

What is claimed is:

1. A method of initializing a memory system, the memory system including a host processor and a plurality of memory cards, the memory cards connected in a cascade arrangement and each including a relative card address (RCA) register, said method comprising:
   storing in advance a same default RCA in the RCA register of each memory card; and
   sequentially storing respectively unique RCAs in the memory cards by issuing a sequence of commands from the host processor using the default RCA.

2. The method of claim 1, wherein the host processor initially issues a first command including the default RCA which is received by a first memory card among the plurality of memory cards,
   wherein the first memory card generates a response to the host processor upon detecting a coincidence between the default RCA of the first command and the default RCA stored in advance in the RCA register.

3. The method of claim 2, wherein the response includes a card identification (CID) of the first memory card.

4. The method of claim 2, wherein the response includes partition information of the first memory card.

5. The method of claim 2, further comprising storing a unique RCA in the RCA register of the first memory card after the first memory card has received the first command.

6. The method of claim 5, wherein, after the first unique RCA has been stored in the RCA register of the first memory card, the host processor issues a second command including the default RCA which is received by a first memory card,
   wherein the first memory card transmits the second command to a second memory card among the plurality of memory cards upon detecting a non-coincidence between the default RCA of the second command and the first unique RCA stored in the RCA register of the first memory card,
   wherein the second memory card generates a response to the host processor upon detecting a coincidence between the default RCA of the second command and the default RCA stored in advance in the RCA register of the second memory card.

7. The method of claim 1, wherein at least one of the plurality of memory cards is a removable memory card.

8. A memory system, comprising:
   a host processor;
   a plurality of cascade connected memory cards connected to the host processor, each of the memory cards storing a same default relative card address (RCA);
   wherein the host processor is configured to sequentially access each memory card using the default RCA, and to change the default RCA to a unique RCA upon each sequential access.

9. The memory system of claim 8, wherein each of the memory cards comprises a memory and a memory controller, and wherein the memory controller includes an RCA register which stores the default RCA prior to initialization of the memory system.

10. The memory system of claim 9, wherein the memory controller of each memory card further includes a card identification (CID) register.

11. The memory system of claim 10, wherein the host processor is configured to initially issue a first CID command including the default RCA which is received by a first memory card among the plurality of memory cards, and
    wherein the first memory card generates a CID response to the host processor upon detecting a coincidence between the default RCA of the first command and the default RCA stored in advance in the RCA register.

12. The memory system of claim 11, wherein the host processor is further configured to store a first unique RCA in the RCA register of the first memory card after the first memory card has generated the CID response.

13. The memory system of claim 12, wherein, after the first unique RCA has been stored in the RCA register of the first memory card, the host processor is configured to issue a second CID command including the default RCA which is received by a first memory card,
    wherein the first memory card is configured to transmit the second CID command to a second memory card among the plurality of memory cards upon detecting a non-coincidence between the default RCA of the second command and the first unique RCA stored in the RCA register of the first memory card, and
    wherein the second memory card generates a CID response to the host processor upon detecting a coincidence between the default RCA of the second command and the default RCA stored in advance in the RCA register of the second memory card.

14. The memory system of claim 9, wherein the memory controller of each memory card further includes a partition information (PI) register.

15. The memory system of claim 14, wherein the host processor is configured to initially issue a first PI command including the default RCA which is received by a first memory card among the plurality of memory cards, and
    wherein the first memory card generates a PI response to the host processor upon detecting a coincidence between the default RCA of the first command and the default RCA stored in advance in the RCA register.

16. The memory system of claim 15, wherein the host processor is further configured to store a first unique RCA in the RCA register of the first memory card after the first memory card has generated the PI response.

17. The memory system of claim 16, wherein, after the first unique RCA has been stored in the RCA register of the first memory card, the host processor is configured to issue a second PI command including the default RCA which is received by a first memory card,
    wherein the first memory card is configured to transmit the second PI command to a second memory card among the plurality of memory cards upon detecting a non-coincidence between the default RCA of the second command and the first unique RCA stored in the RCA register of the first memory card, and wherein the second memory card generates a PI response to the host processor upon detecting a coincidence between the default RCA of the second command and the default RCA stored in advance in the RCA register of the second memory card.

18. The memory system of claim 8, wherein at least one of the plurality of memory cards is a removable memory card.

19. A computer system, comprising:
a host processor;
a plurality of peripheral devices operatively coupled to the host processor;
at least one of the peripheral device is a memory device operatively coupled to the host processor, the memory device include a plurality of cascade-connected memory cards, wherein each of the memory cards includes a relative card address (RCA) register storing a same default RCA prior to initialization of the computer system;
wherein, upon initialization of the computer system, the host processor is configured to sequential accesses the cascade-connected memory cards using the default RCA.

20. The computer system of claim 19, wherein the computer system is a mobile communications device, and wherein the peripheral devices include a display device and a digital media broadcasting device.

* * * * *